United States Patent [19]

Aikins et al.

[11] 4,398,581
[45] Aug. 16, 1983

[54] TREE PROCESSING APPARATUS

[76] Inventors: Warren A. Aikins, 3489 Indian Creek Dr.; Thomas N. Melin, 1424 24th Ave., both of Longview, Wash. 98632

[21] Appl. No.: 285,156

[22] Filed: Jul. 20, 1981

[51] Int. Cl.$^3$ .............................................. B27L 7/00
[52] U.S. Cl. .................................. 144/366; 144/3 K; 144/34 E; 144/193 A
[58] Field of Search ................. 144/3 D, 34 R, 34 A, 144/34 E, 3 K, 193 R, 193 A, 339, 366

[56] References Cited

U.S. PATENT DOCUMENTS

| | | | |
|---|---|---|---|
| 2,542,952 | 2/1951 | White | 144/34 A |
| 3,183,953 | 5/1965 | MacMillan et al. | 144/34 E |
| 3,491,810 | 1/1970 | Williams | 144/3 D |
| 3,638,694 | 2/1972 | Robinson et al. | 144/34 A |
| 3,720,249 | 3/1973 | Peltonen | 144/34 E |
| 3,848,648 | 11/1974 | Dika et al. | 144/34 A |
| 3,913,641 | 10/1975 | White | 144/34 E |
| 3,999,582 | 12/1976 | Allen et al. | 144/34 |
| 4,144,918 | 3/1979 | Hallstrom | 144/3 D |
| 4,176,696 | 12/1979 | Greeninger | 144/3 K |
| 4,273,171 | 6/1981 | Spaulding, Jr. | 144/3 K |

FOREIGN PATENT DOCUMENTS 1087449  10/1980  Canada .......................... 144/193 A Primary Examiner—W. D. Bray
Attorney, Agent, or Firm—Lee R. Schermerhorn

[57] ABSTRACT

Apparatus on the back of a tractor carries an adjustable shear blade frame. This frame may be inclined upward or downward from horizontal to cut off trees at ground level and parallel with an inclined ground surface. The frame may be side shifted to receive the trunk of a tree to be felled when the tractor is not backed to a precise position adjacent the tree. The frame may be removed from the apparatus for felling trees at a distance from the tractor. The frame may be turned upright and side shifted to cut to desired lengths the trunks of felled trees pulled alongside the tractor. The frame is also equipped for splitting short lengths of the tree trunks into firewood.

17 Claims, 13 Drawing Figures

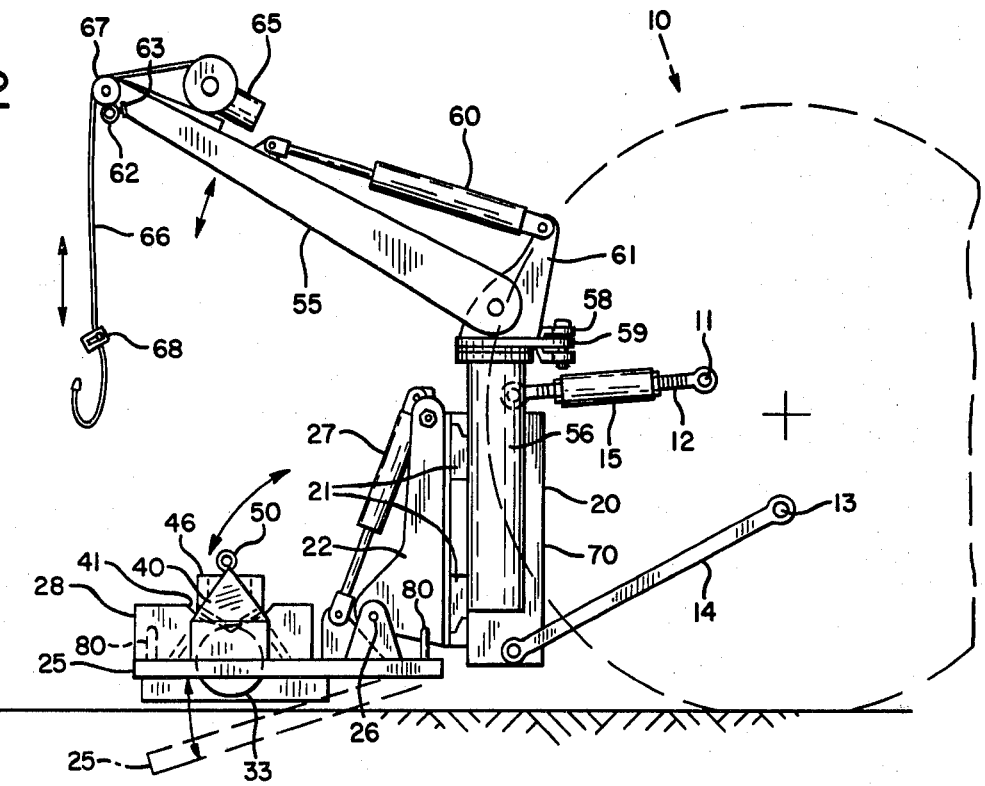
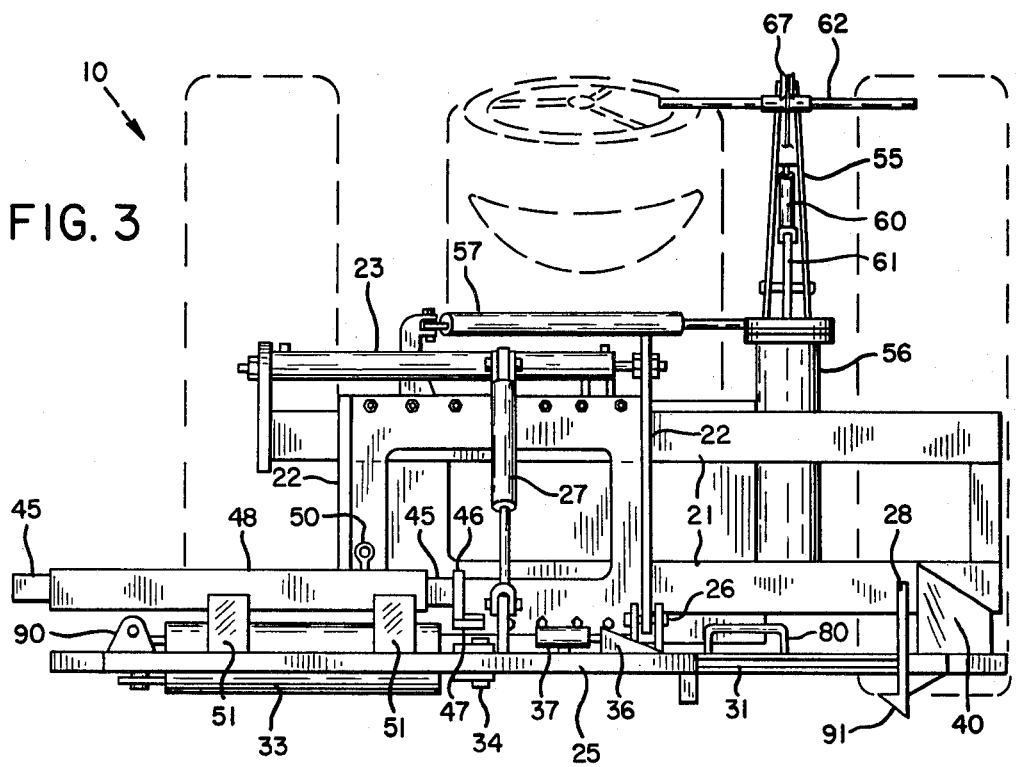

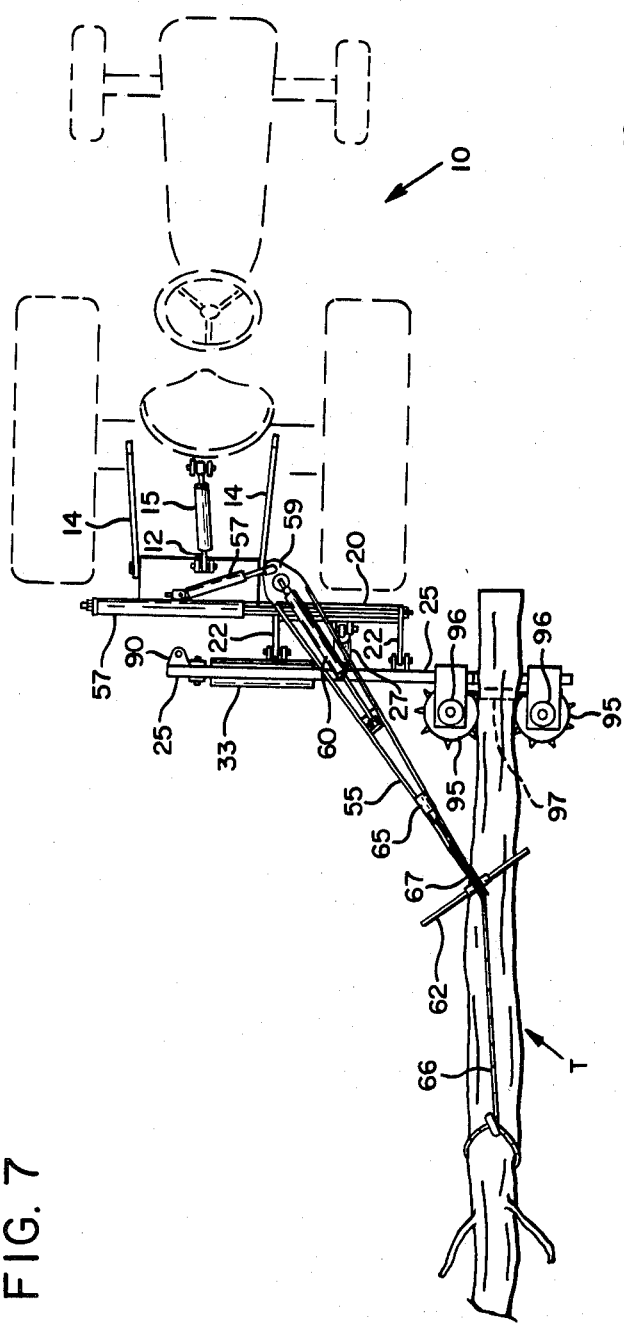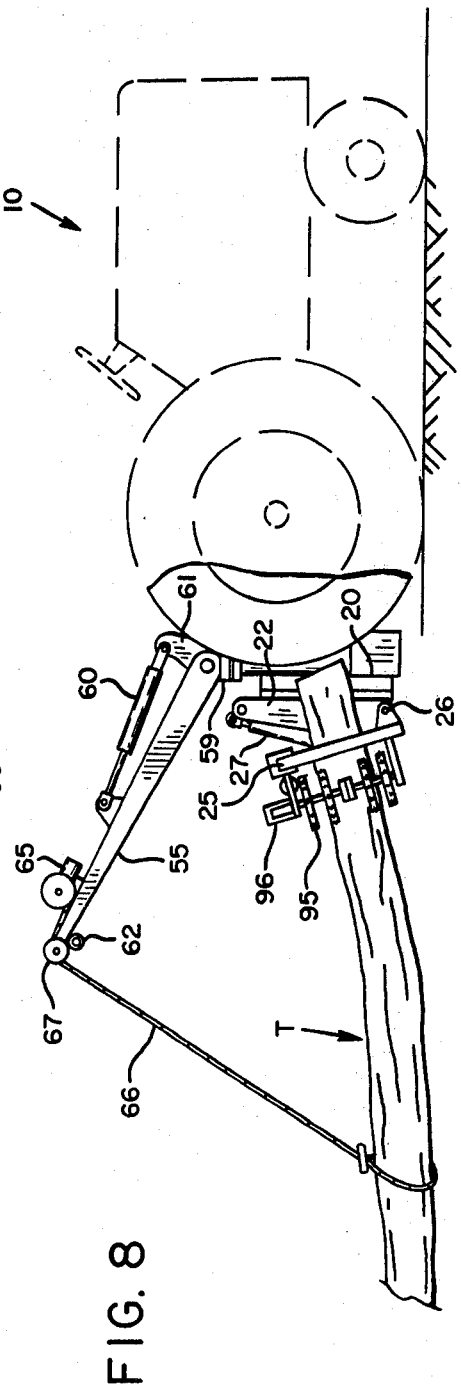
FIG. 7
FIG. 8

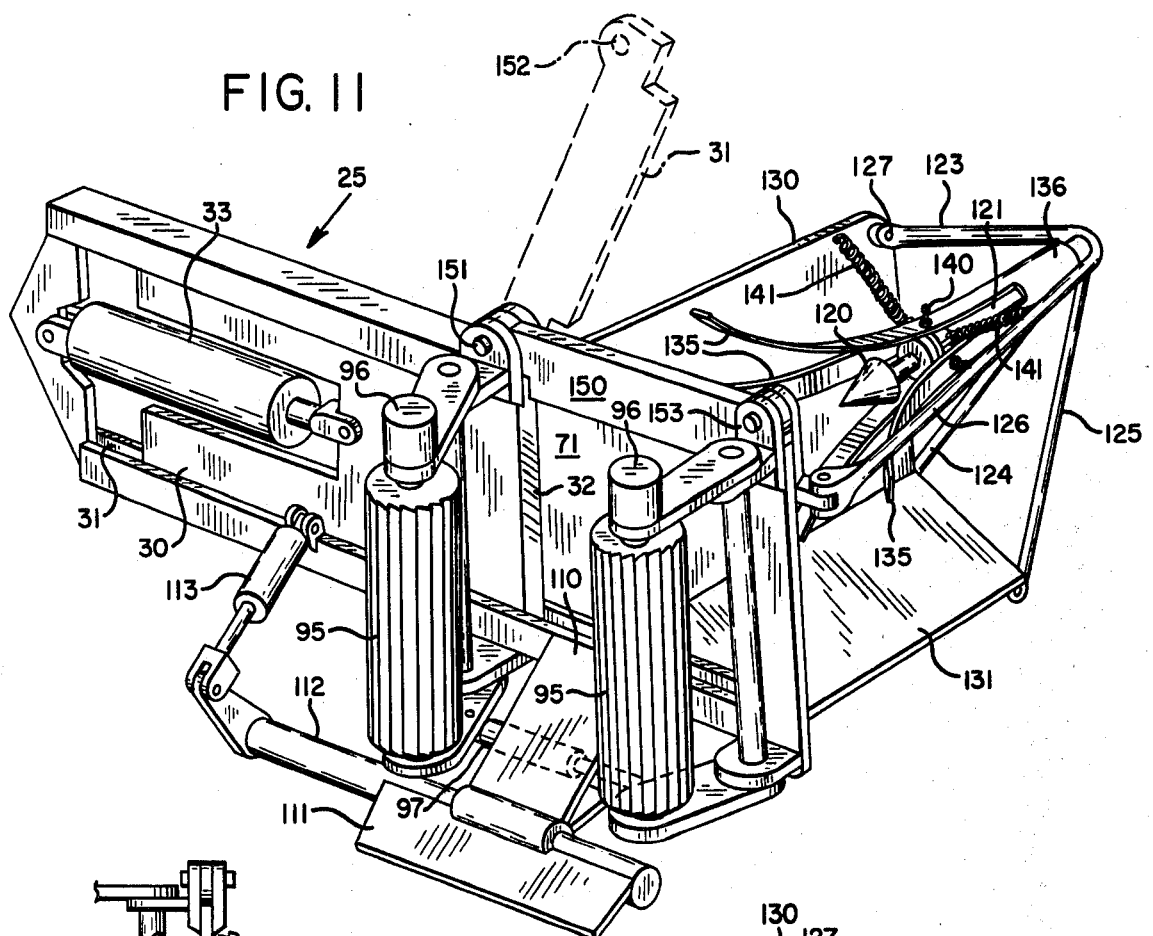
FIG. 11
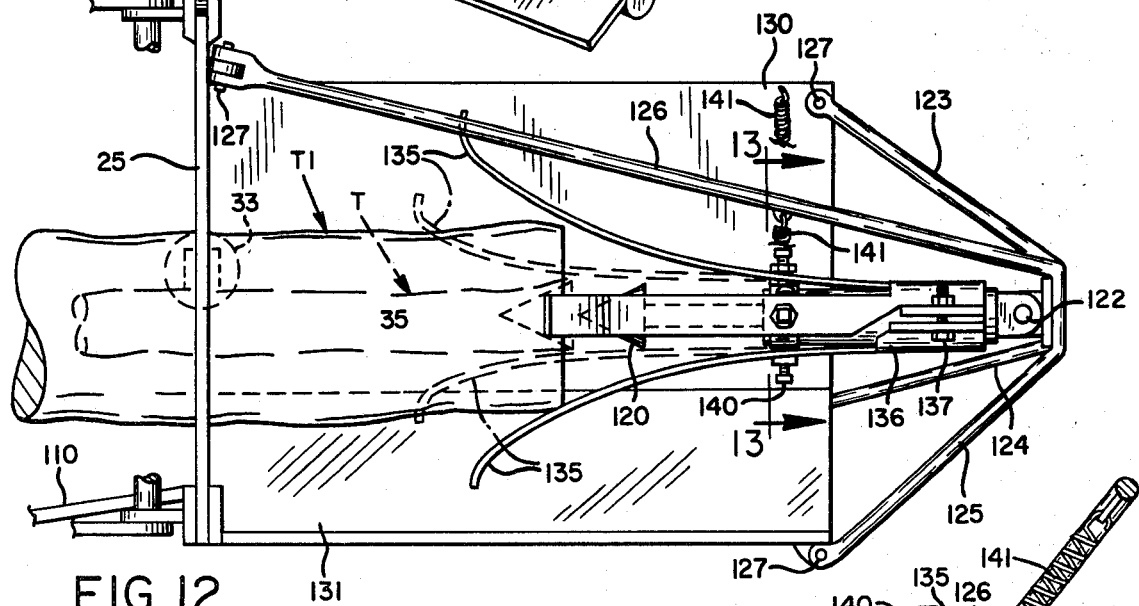
FIG. 12
FIG. 13

TREE PROCESSING APPARATUS

BACKGROUND OF THE INVENTION

This invention relates to apparatus adapted for mounting on a tractor for felling trees, cutting the trunks into desired lengths and splitting short lengths of the trunks into fire wood.

Various forms of tractor mounted apparatus have heretofore been proposed for accomplishing one or two of the mentioned functions. In general these devices have been impractical because they have been too complicated, cumbersome and expensive to manufacture and operate. No practical single apparatus has been provided to process standing trees into fire wood or logs in a simple and economical manner.

There is a need for a practical form of tractor mounted apparatus which will perform all three functions of felling trees, cutting the trunks into appropriate lengths for plywood, saw logs or fire wood and then splitting the latter, all in a series of operations performed quickly by a single operator with a single apparatus on the site of the growing trees.

SUMMARY OF THE INVENTION

The present apparatus has an adjustable shear blade which will operate parallel with a horizontal or inclined ground surface to fell a tree.

The tree is made to fall in a desired direction by a swinging boom arm which may be caused to bear against one side of the tree trunk. The boom arm is equipped with an adjustable transverse safety bar to push the tree away in the direction of the boom when desired. The shear blade may be equipped with wedge devices to facilitate the shearing action and assist in controlling the direction of all of the trees.

The shear blade may then be turned to upright position for cutting the fallen tree trunk to a desired length or for cutting it into short lengths for fire wood or other purposes. A boom winch cable and feed rolls are provided for pulling the tree trunk through the shear to perform this function.

For splitting fire wood the anvil end of a shear blade frame is provided with a splitting wedge and the shear blade is provided with a splitter pusher. A short section of tree trunk placed on the shear blade frame with the latter in horizontal position is thereby split by the action of an hydraulic cylinder which operates the shear blade.

Thus, the three functions of felling trees, cutting the trunks to desired lengths and splitting short sections into fire wood are all accomplished by a relatively simple form of apparatus adapted for mounting on a tractor and operated by an hydraulic system energized by the tractor.

The foregoing and other objects and advantages will become apparent from the following description of the preferred embodiment of the apparatus illustrated in the accompanied drawings. Various changes may be made in details of construction and arrangement of parts and certain features may be used without others. All such modifications within the scope of the appended claims are included in the invention.

BRIEF DESCRIPTION OF THE DRAWINGS

FIG. 2 is a side elevation view.

FIG. 3 is a rear elevation view.

FIG. 7 is a top plan view showing the operation of cutting the trunk of a felled tree into sections of desired length.

FIG. 8 is a side elevation view of the operation in FIG. 7.

FIG. 11 is a perspective view of an attachment to the shear blade frame for splitting short blocks of wood.

FIG. 12 is a side elevation view of the splitting attachment in FIG. 11.

FIG. 13 is a view on the line 13—13 in FIG. 12.

DESCRIPTION OF THE PREFERRED EMBODIMENT

Figure 1:
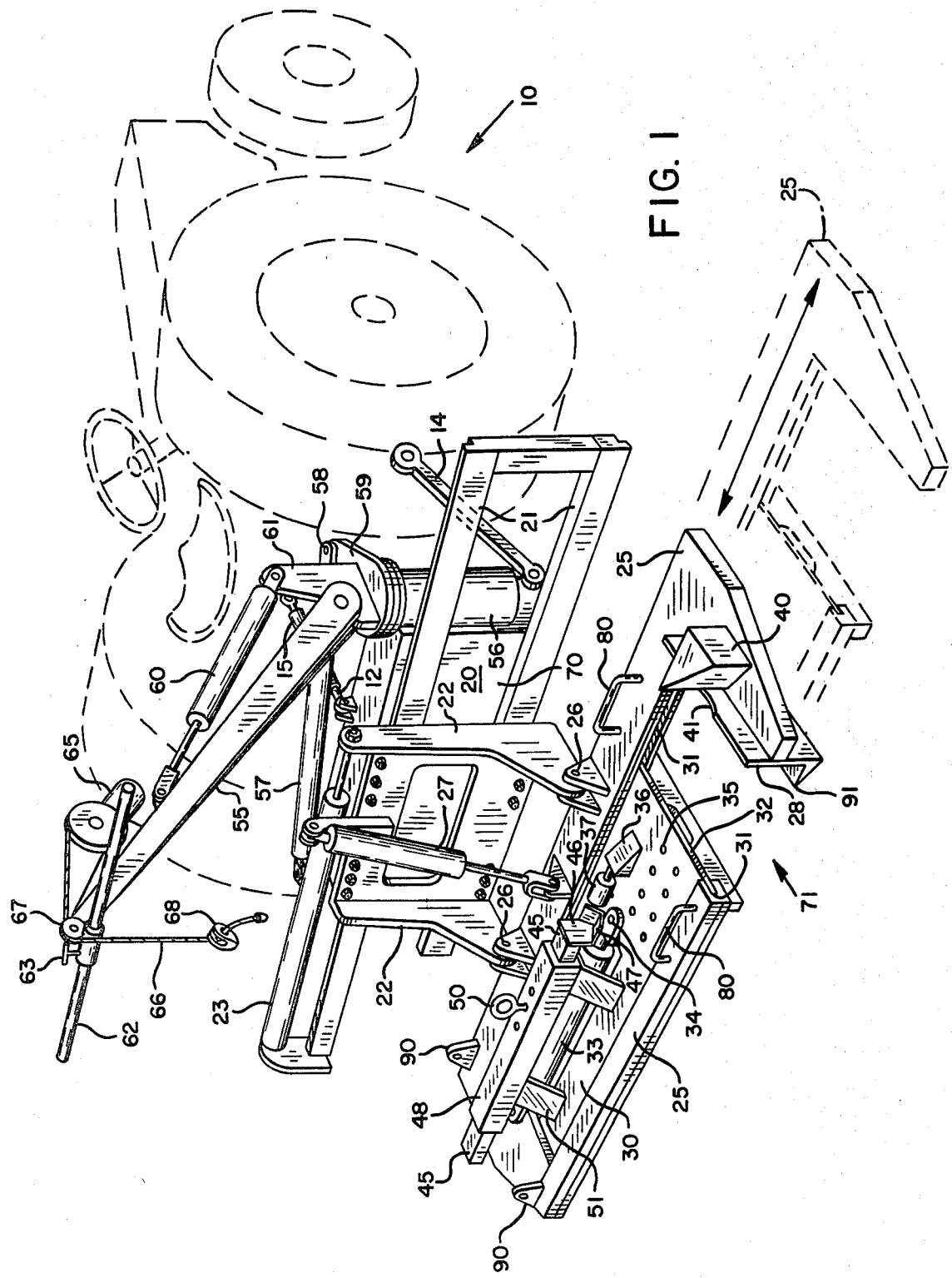
FIG. 1 is a perspective view of a tree processing apparatus embodying the invention mounted on a tractor which is shown in broken lines.

The present apparatus in mounted preferably on the back end of a tractor 10 as shown in FIGS. 1 through 5. Tractors of the size and type suitable for the present purpose are adapted for connection with a conventional three point hitch for mounting various types of equipment on the back of the tractor.

An upper central stud at 11 supports the forward end of an upper link 12 and a pair of lower studs at 13 on opposite sides of the tractor support the forward ends of a pair of lower links or arms 14. Upper link 12 is adjustable in length by means of a turn buckle 15. The rear ends of the three links 12, 14 14 are connected at roughly corresponding positions to a main support frame 20 for the present apparatus. For most purposes the main frame 20 is adjusted to vertical position by means of the length adjustment 15 on upper link 12.

Main frame 20 has a pair of upper and lower transverse support rails 21 for a lateral adjustment frame 22 as shown in FIG. 1. Frame 22 is reciprocated on rails 21 by a piston rod in an hydraulic cylinder 23, one end of the cylinder being connected to an extension of one end of the upper rail 21.

A shear blade frame 25 is pivotly connected to lateral adjustment frame 22 by horizontal hinge pins 26. Shear blade frame 25 may be pivoted downward to an angle below horizontal position and upward to a vertical position by a piston rod in hydraulic cylinder 27 which is supported at its upper end on adjustment frame 22.

One end of shear blade frame 25 carries an anvil plate 28 for cooperation with a shear blade 30 mounted in shear blade guides 31. A knife edge 32 on one end of the shear blade confronts the anvil plate 28. Shear blade 30 is reciprocated by an hydraulic cylinder 33 having one end connected to shear blade frame 25 and a piston rod in its other end connected at 34 to the shear blade.

Figure 4:
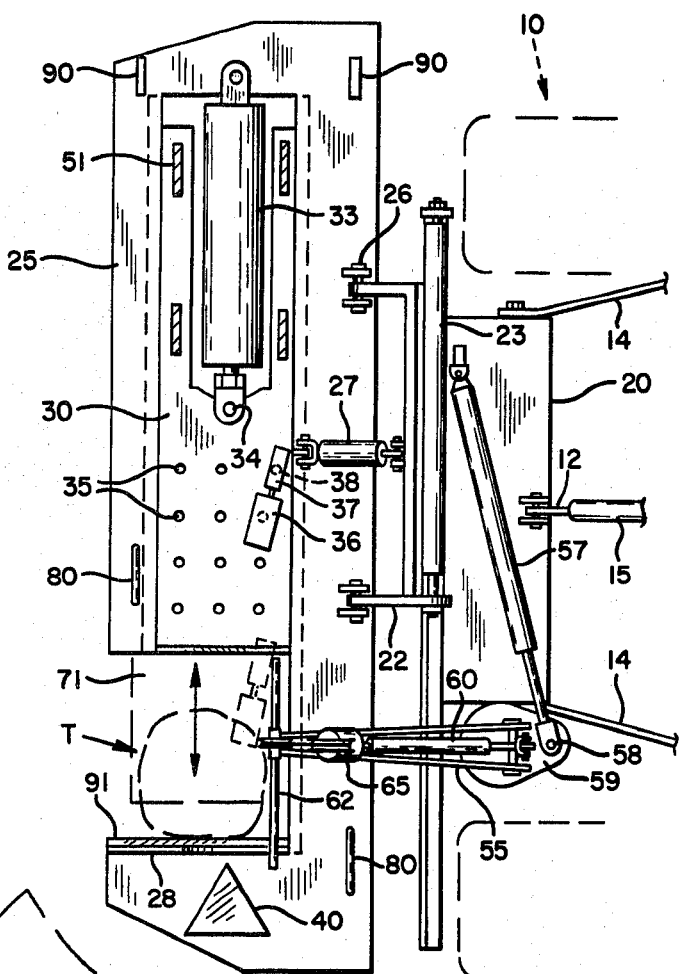
FIG. 4 is a top plan view.

Spaced back from its knife edge 32 the shear blade 30 contains plurality of adjustment holes 35 to position a felling wedge 36 on the top surface of the shear blade. In the illustrated embodiment the wedge 36 is mounted on the end of a piston rod in an hydraulic cylinder 37. As indicated in FIG. 4 hydraulic cylinder 37 has a pin 38 projecting from its underside, which pin is inserted in a selected one of the holes 35 to assist in making the tree fall in the desired direction and to reduce the binding action of the cut wood on the shear blade as the blade advances into the wood. As a modification, cylinder 37 may be omitted and locating pin 38 may be mounted directly on the underside of wedge 36.

A splitting wedge 40 is mounted on the end of shear blade frame 25 immediately behind anvil plate 28. The anvil plate has a cradle depression 41 in its upper edge to support one end of a tree trunk section against the splitting edge of wedge 40.

A splitter pusher 45 has a depending end plate 46 with a V-shaped cradle 47 on its lower end to support the opposite end of a tree trunk section to be split. Splitter pusher 45 is slidably adjustable in a guide tube frame 48 having a series of holes to receive a lock pin 50. Frame 48 is connected to shear blade 30 by four legs 51. Thus, the pusher 45 may be adjusted to an appropriate position in frame 48 according to the length of the block to be split. The advancement of shear blade 30 causes wedge 40 to split the block.

A boom arm 55 is mounted for swinging movement in a support frame 56 on the main support frame 20. The boom is swung from side to side by an hydraulic cylinder 57 connected at one end to the main frame 20 and having a piston rod connected at 58 to the base plate 59 for the boom. The boom is raised and lowered by a piston rod in an hydraulic cylinder 60 connected at one end to a tail mount 61 on the base plate 59.

A transverse safety bar 62 is longitudinally adjustable on the end of the boom 55 and secured in adjusted position by a lock device 63.

Also mounted on the end of the boom is an hydraulic winch 65 having a cable 66 trained over a sheave 67 and equipped with a choker fitting 68.

The hydraulic system for the various hydraulic units mentioned above includes a reserve tank 70 on the main frame 20, the system being pressured by an hydraulic pump driven by the tractor engine. The hydraulic units are controlled by conventional manual valves on a control panel mounted in a convenient position on the tractor as will be understood by persons skilled in the art.

In operation, referring first to FIG. 1, the tractor is backed up to a tree to be felled. In doing this the steering maneuver need not be precise; as the tractor approaches the tree, shear blade frame 25 is side shifted by cylinder 23 to align opening 71 between anvil plate 28 and retracted shear blade 30 with the trunk of the tree and the backward movement is stopped with the tree in opening 71.

The side shifting of frame 25 compensates for error in the driver's initial approach to the tree as well as the physical impossibility of making a desired approach in some situations.

If it is desired to make the tree fall to the rear, the tractor would approach the tree with the tree as nearly as possible directly behind the boom support frame 56 and then the boom would be lowered by cylinder 60 to press the safety bar 62 against the trunk of the tree and wedge 36 would not be necessary. A single stroke of shear blade 30 by cylinder 33 would shear the tree trunk and the tree would fall away from the tractor. When the tree is sheared off, actuating cylinder 60 pushes the tree in the desired direction.

Figure 5:
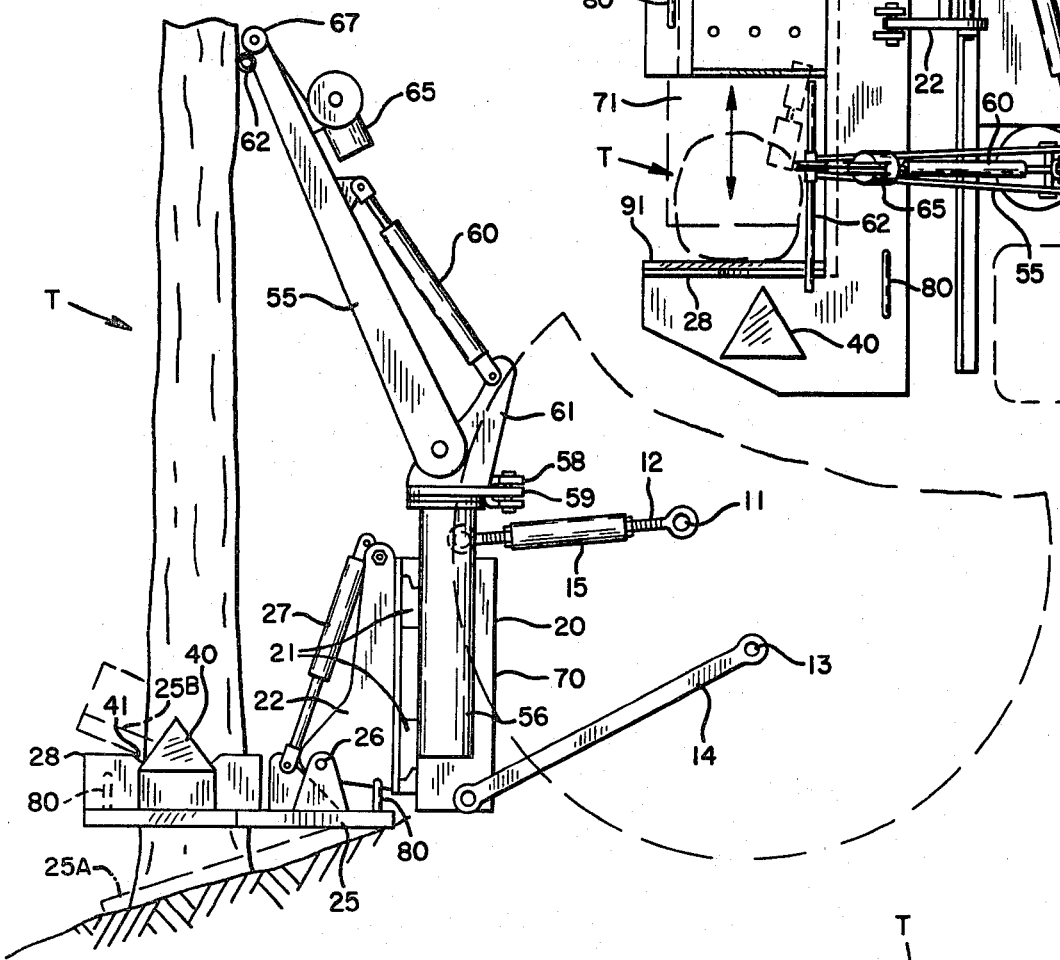
FIG. 5 is a side elevation view showing the operation of felling a tree.
Figure 6:
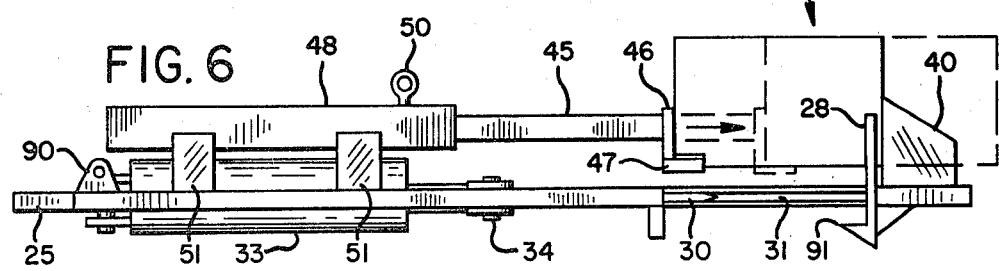
FIG. 6 is a rear elevation view of the shear blade frame showing the operation of splitting a short section of a tree trunk into fire wood.

If the ground surface were approximately level the shear blade frame 25 would have been placed in horizontal position by cylinder 27 as shown in solid lines in FIG. 5. If the ground surface slopes down rearwardly the shear blade frame would be depressed to approximately parallel the ground surface as indicated in broken lines at 25A. On the other hand, if the ground surface inclined upward in a rearward direction the shear blade frame would be raised to the inclined position indicated at 25B. Thus with a relatively even ground surface the tree could be sheared very close to ground level and parallel with a level or inclined ground surface.

If it is desired to make the tree fall sideways, one side of boom arm 55 may be brought to bear against a side of the tree trunk by the action of hydraulic cylinder 57 in FIG. 1. If the desired direction of fall is away from the right side of the tractor wedge 36 may also be used if necessary.

Figure 9:
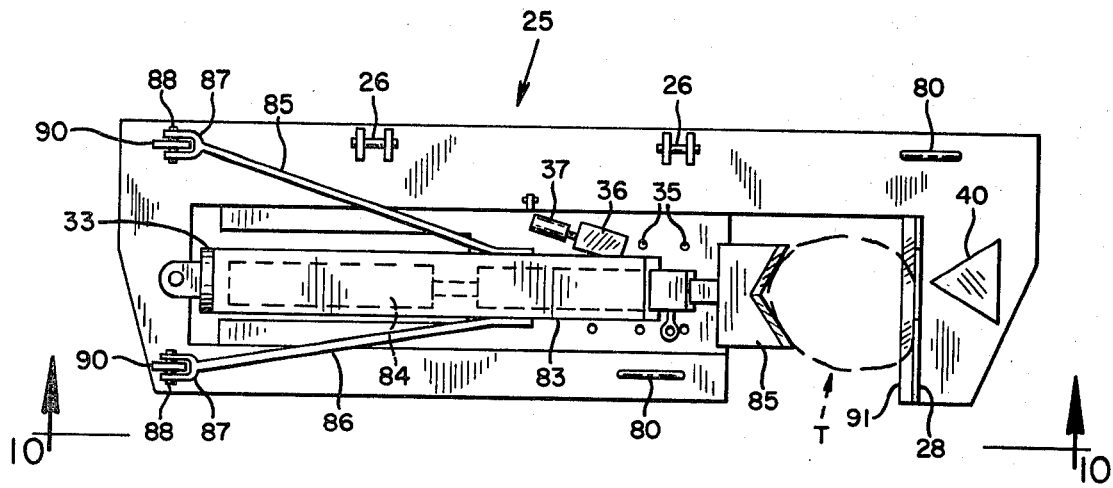
FIG. 9 is a top plan view of the shear blade frame removed from the apparatus for felling a tree at a distance from the tractor.
Figure 10:
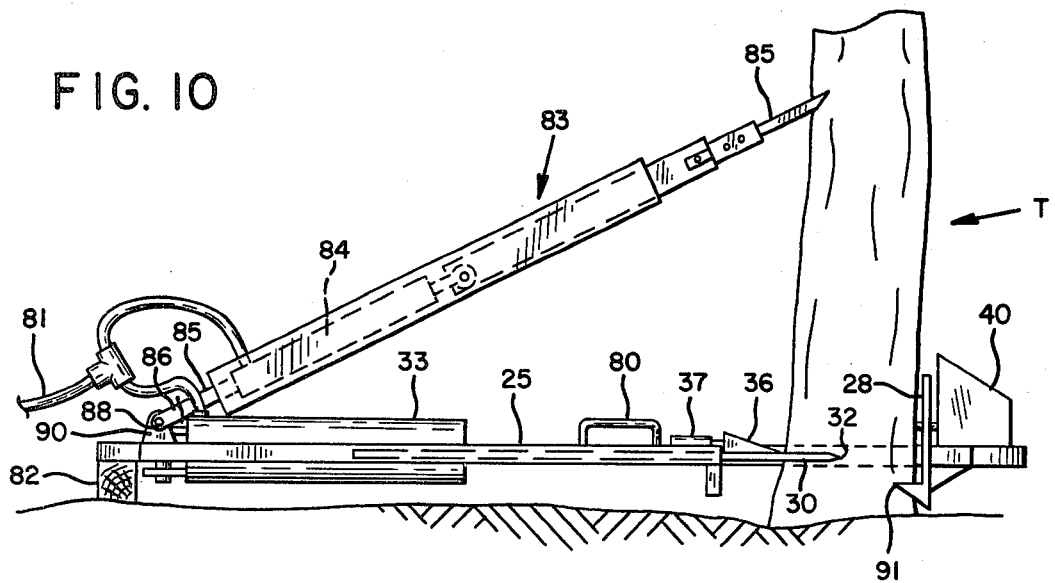
FIG. 10 is a side elevation view of the operation in FIG. 9 on the line 10—10 in FIG. 9.

If the tractor cannot approach the tree to be felled then the shear blade frame 25 is removed by withdrawing hinge pins 26 and carrying the shear blade frame by handles 80. This mode of operation is shown in FIGS. 9 and 10. An hydraulic supply line 81 of sufficient length to reach back to the hydraulic system on the tractor is provided. The end of frame 25 remote from the tree is elevated by end support 82.

In this mode of operation the shear blade frame 25 is provided with a tree pusher 83 having an hydraulic cylinder 84 and a V-shaped pusher blade 85. Pusher 83 is pivotally connected to frame 25 by a pair of arms 86 having clevis ends 87 secured by pins 88 to apertured ears 90 on the end of frame 25 remote from anvil plate 28. Frame 25 is placed so as to orient pusher 83 in the desired direction and wedge 36 may be used if necessary. Manual valves, not shown, may be provided close to frame 25 to control pusher cylinder 84, wedge cylinder 37 and shear blade cylinder 33. The lower edge of anvil plate 28 forms a knife edge 91 to penetrate the tree trunk and stabilize shear blade frame 25.

After the tree has been felled by any one of the several modes of operation described, it is delimbed by suitable means and the trunk is pulled up along side the tractor by winch 65 and cable 66 as shown in FIGS. 7 and 8 to cut the trunk to a desired length or to cut it into short blocks for fire place wood or other purposes.

In preparation for this operation, shear blade frame 25 is turned to an upright position by cylinder 27 and lateral adjustment frame 22 is shifted to its limit of movement in a direction to a place opening 71 beyond the outside edge of the adjacent tire of the vehicle. Then the tree trunk is placed in opening 71 in FIG. 1 by cable 66. The tree trunk may extend forward alongside the tractor to any distance necessary to cut the trunk at the desired location. Shear blade frame 25 is adjusted to the proper angle on hinge pins 26 to make a square cut through the tree trunk as shown in FIG. 8.

After each cut, the tree trunk is advanced through opening 71 to the position for the next cut by means of winch cable 66 and/or hydraulic driven feed roll mechanism 95 having hydraulic motors 96 may be attached to the shear blade frame 25 to facilitate the operation, if desired. A constant pressure of the feed rolls against opposite sides of the tree trunk is maintained by an hydraulic feed roll squeeze cylinder 97 with accumulator.

To split short blocks for fireplace wood, shear blade frame 25 is returned to horizontal position as shown in FIG. 1 and pusher 45 is adjusted according to the length of the blocks by inserting lock pin 50 into an appropriate hole in frame 48 with shear blade 30 fully retracted. One end of the block is supported in cradle 41 and the other end is supported in cradle 47. When pusher 45 is advanced by cylinder 33 the block is split into two pieces by wedge 40. Each piece may be split again in similar manner if desired. Also, the wedge 40 may take other forms to split the block into three or four pieces with a single stroke of the pusher.

Additional attachment for shear blade frame 25 are illustrated in FIGS. 11-13.

One such attachment is an inclined skid plate 110 to assist in raising and guiding the leading end of a tree trunk or log into shear frame opening 71 as the log is advanced by winch cable 66 on boom 55 as shown in FIGS. 7 and 8. The lower end of skid plate 110 is preferably provided with an auxiliary pivotal skid plate or log lifter 111 mounted on a shaft 112 for rotation by a log lifter cylinder and piston rod 113.

If the feed movement of a tree trunk by cable 66 or feed rolls 95 is obstructed by a tree branch or knot on the underside of the tree trunk, cylinder 113 may be actuated to rotate plate 111 upward so as to lift the tree trunk onto skid plate 110 and into opening 71 for advancement to a desired position for cutting the tree trunk to a desired length by shear blade 30.

Other attachments in FIGS. 11-13 provide a novel method for splitting short lengths of tree trunks into fire wood or for other purposes. Confronting the end of a tree trunk or log which has been advanced a short distance through opening 71 is a splitter wedge 120 mounted on a piston rod in an hydraulic cylinder 121. Splitter wedge 120 may be a simple wedge, a cone or a cross-shaped wedge to make a four-way split, as desired.

Cylinder 121 is pivotally mounted at 122 in a frame comprising four tie-rods 123,124,125 and 126, a vertical side plate 130 and a laterally inclined bottom skid plate 131. The forward ends of short tie-rods 123, 124 and 125 are connected by pins 127 to the end of plates 130 and 131 and the forward end of long tie-rod 126 is similarly connected to an upper portion of shear blade frame 25.

In order to center the splitter wedge 120 in the ends of both large and small tree trunks or logs the pivotally mounted cylinder 121 is equipped with a plurality of divergent resilient spring steel centering guide arms 135. The forward ends of these leaf spring guide arms are mounted on a split holding clamp 136 which is secured on cylinder 121 by a clamp screw 137. The spread of the arms is controlled by individual adjusting screws 140 and the movable pivotal assembly of cylinder 121 and arms 135 is normally centered by one or more supporting and centering springs 141.

In operation, as a tree trunk or log is advanced through opening 71 the leading end encounters the divergent leaf springs 135 and pivots the cylinder 121 to center the splitter wedge 120 in confronting relation to the advancing end of the tree trunk. Thus, the splitter wedge will be centered in different sizes of tree trunks ranging from the small tree trunk T to the large tree trunk T1 illustrated in FIG. 12.

When the tree trunk has reached the desired position in opening 71 its advancement is halted and shear blade 30 is actuated by hydraulic cylinder 33. When the cutting edge 32 has penetrated 80% to 90% of the distance through the tree trunk cylinder 121 is actuated either manually or by position limit switches to force splitting wedge 120 into the short portion of the tree trunk. Blade 30 does not necessarily have to be stopped for splitting action to take place. The shear blade 30 is utilized as a chuck to hold a fire wood length piece of the tree trunk in position for splitting by the action of splitter wedge 120 and hydraulic cylinder 121.

When the splitting action is completed and shear blade 30 has completed its stroke, the split pieces drop down on inclined skid plate 131 and are discharged to one side of apparatus. Thus, the shear blade 30 also serves as an anvil behind the block of wood being split, to resist the thrust of splitter wedge 120.

This makes it desirable to support the upper edge of shear blade 30 in the opening 71. This accomplished by providing a guide arm 150 to span the upper side of opening 71 as shown in FIG. 11. The underside of arm 150 contains a shear blade guide groove 31 to prevent deflection of the upper edge of shear blade 30. One end of arm 150 is pivotally mounted on a pin 151 in shear blade frame 25 and the other end is provided with an aperture 152 to receive a pin 153 in the extremity of frame 25.

When it is intended to cut the tree trunk or log to longer lengths not intended for splitting into fire wood the whole splitting attachment shown in FIG. 12 may be removed from shear blade frame 25 or the pins 127 may be removed from tie-rods 124, 125 and 126 and the splitter wedge 120 and cylinder 121 swung up out of the way using tie-rod 123 and its pin 127 as a hinge.

When the splitter attachment in FIGS. 11-13 is used, the splitter wedge 40 and splitter pusher 45 in FIG. 1 are not necessary and would be considered as alternative attachments for the shear blade frame 25. Removal of the splitter attachment in FIGS. 11-13 allows shear blade frame 25 to be side shifted back to centered position behind the tractor, by cylinder 23 in FIG. 1, for travel.

The big advantage of the splitter attachment in FIGS. 11-13 is that it permits a single operator to cut tree trunks or logs into blocks of fire wood length, and then split the blocks, in a continuous operation without handling the blocks.

Thus, all the operations necessary for processing a standing tree into fire wood are performed by the present apparatus with the apparatus mounted on the back of a tractor. It is not necessary to maneuver the tractor back and fourth repeatedly in order to get it in a precise position to fell a standing tree. The side shift mechanism adjusts for the driver's errors in backing up to the tree thereby saving considerable time in this operation.

The shear blade frame is adjustable in angle and elevation to adapt to the terrain around the tree and most trees can be cut off at ground level. The shear blade frame is removable from the tractor for felling trees that cannot be directly approached by the tractor.

The same shear blade frame used for felling trees is used for cutting the trunks to desired lengths and for splitting blocks of the tree trunks into fire wood, thereby avoiding extra parts and mechanisms to perform this final function. All of these functions may be performed by a single operator. These features and advantages make the present apparatus very efficient and economical to use, resulting in a significant saving of time and energy to complete the entire processing of standing trees into fire wood.

What is claimed is:

1. A tree processing apparatus adapted for mounting on the end of a tractor comprising a support frame having laterally extending support rails for a lateral adjustment frame slidable thereon, a shear blade frame hinged to said lateral adjustment frame, said shear blade frame having an anvil plate at one end thereof and a shear blade slidable toward and away from said anvil plate, said shear blade frame having pivotal movement on said hinge to a first working position approximately parallel to the ground surface for felling trees and to a second working position approximately perpendicular to the ground surface for cutting the trunks of felled trees to desired lengths, said lateral adjustment frame being slidable on said support rails to side shift said shear blade frame and align an opening between said anvil plate and the retracted shear blade with a tree to be felled, a wedge on said lateral adjustment frame being operable to side shift said opening in said shear blade frame between said anvil plate and retracted shear blade beyond one side of the tractor to cut the trunk of a felled tree alongside the tractor, said shear blade frame in said second working position having an approach side and a rear side relative to said felled tree trunk, and a splitter wedge and cylinder mount on said rear side of said shear blade frame with said wedge confronting the end of said felled tree trunk, said shear blade serving as an anvil for splitting said tree trunk.

2. An apparatus as defined in claim 1, said splitter wedge and cylinder being pivotally mounted in a frame on said shear blade frame, and a plurality of divergent arms on said cylinder engagable with said end of the tree trunk to center said wedge on said end of the tree trunk.

3. A tree processing apparatus adapted for mounting on the end of a tractor comprising a support frame having laterally extending support rails for a lateral adjustment frame slidable thereon, a shear blade frame hinged to said lateral adjustment frame, said shear blade frame having an anvil plate at one end thereof and a shear blade slidable toward and away from said anvil plate, said shear blade frame having pivotal movement on said hinge to a first working position approximately parallel to the ground surface for felling trees and to a second working position approximately perpendicular to the ground surface for cutting the trunks of felled trees to desired lengths, said lateral adjustment frame being slidable on said support rails to side shift said shear blade frame and align an opening between said anvil plate and the retracted shear blade with a tree to be felled, said lateral adjustment frame being operable to side shift said opening in said shear blade frame between said anvil plate and retracted shear blade beyond one side of the tractor to cut the trunk of a felled tree alongside the tractor, and an inclined skid plate mounted on said shear blade frame under said opening therein to guide said tree trunk into said opening.

4. An apparatus as defined in claim 3 including an hydraulic cylinder and piston rod connected between said skid plate and shear blade frame to lift said tree trunk into said opening.

5. A tree processing apparatus adapted for mounting on the end of a tractor comprising a support frame having laterally extending support rails for a lateral adjustment frame slidable thereon, a shear blade frame hinged to said lateral adjustment frame, said shear blade frame having an anvil plate at one end thereof and a shear blade slidable toward and away from said anvil plate, said shear blade frame having pivotal movement on said hinge to a first working position approximately parallel to the ground surface for felling trees and to a second working position approximately perpendicular to the ground surface for cutting the trunks of felled trees to desired lengths, said lateral adjustment frame being slidable on said support rails to side shift said shear blade frame and align an opening between said anvil plate and the retracted shear blade with a tree to be felled, a wedge on said shear blade, and means for mounting said wedge in different positions on the shear blade to make a tree being felled by said shear blade fall in a desired direction.

6. An apparatus as defined in claim 5 including an hydraulic cylinder for thrusting said wedge into the opening cut by said shear blade, said mounting means being on said cylinder.

7. A tree processing apparatus adapted for mounting on the end of a tractor comprising a support frame having laterally extending support rails for a lateral adjustment frame slidable thereon, a shear blade frame hinged to said lateral adjustment frame, said shear blade frame having an anvil plate at one end thereof and a shear blade slidable toward and away from said anvil plate, said shear blade frame having pivotal movement on said hinge to a first working position approximately parallel to the ground surface for felling trees and to a second working position approximately perpendicular to the ground surface for cutting the trunks of felled trees to desired lengths, said lateral adjustment frame being slidable on said support rails to side shift said shear blade frame and align an opening between said anvil plate and the retracted shear blade with a tree to be felled, a splitting wedge on the anvil plate end of said shear blade frame and a splitter pusher on said shear blade to split a short length of tree trunk placed between said wedge and pusher.

8. An apparatus as defined in claim 7 including a guide tube for said pusher mounted on said shear blade and means to adjust the length of said pusher extending from an end of of said guide tube.

9. An apparatus as defined in claim 8, said adjusting means comprising a row of holes in said guide tube, and a lock pin in said pusher insertable through one of said holes.

10. A tree processing apparatus adapted for mounting on the end of a tractor comprising a support frame having laterally extending support rails for a lateral adjustment frame slidable thereon, a shear blade frame hinged to said lateral adjustment frame, said shear blade frame having an anvil plate at one end thereof and a shear blade slidable toward and away from said anvil plate, said shear blade frame having pivotal movement on said hinge to a first working position approximately parallel to the ground surface for felling trees and to a second working position approximately perpendicular to the ground surface for cutting the trunks of felled trees to desired lengths, said lateral adjustment frame being slidable on said support rails to side shift said shear blade frame and align an opening between said anvil plate and the retracted shear blade with a tree to be felled, said opening extending through one side margin of said shear blade frame to admit the tree trunk laterally into said opening, a shear blade guide arm pivoted at one end at an intermediate point on said shear blade frame and movable to span said opening between said anvil plate and the retracted shear blade, and means to secure the opposite end of said arm to said one end of said shear blade frame.

11. A tree processing apparatus comprising a shear blade frame having an anvil plate on one end and a shear blade slidable toward and away from said anvil plate to fell a tree, a splitting wedge on said one end of said frame, and a splitter pusher on said shear blade arranged to push a short length of tree trunk lengthwise against said wedge to split the tree trunk.

12. An apparatus as defined in claim 11 including means to pivot said shear blade frame into upright position on one end of a tractor to receive the trunk of a felled tree in approximately horizontal position for cutting the trunk into desired lengths, and means for pulling said tree trunk through said frame to positions for making said cuts.

13. An apparatus as defined in claim 12 including means to shift said shear blade frame to extend beyond one side of the tractor to operate on a felled tree trunk alongside the tractor when the apparatus is mounted on one end of the tractor.

14. An apparatus as defined in claim 11 including a guide tube supported on said shear blade for said splitter pusher, means for adjusting the lengthwise position of said splitter pusher in said guide tube according to the length of said tree trunk to be split.

15. An apparatus as defined in claim 11 including a cradle support on said anvil plate for one end of said length of tree trunk, and a cradle support on said splitter pusher for the opposite end of said length of tree trunk.

16. A method of processing tree trunks comprising feeding a tree trunk lengthwise to a selected position in an opening in a shear blade frame, advancing a shear blade in said frame to cut into the tree trunk in a direction transverse to the tree trunk, utilizing said shear blade as a chuck and anvil to hold the leading end of said tree trunk in confronting relation to a splitter wedge, and then forcing said splitter wedge into said confronting end of the tree trunk to split the tree trunk when said shear blade has advanced almost but not entirely through the tree trunk.

17. Apparatus for cutting and splitting tree trunks comprising a shear blade frame, means for feeding a tree trunk lengthwise to a selected position in an opening in said frame, means for advancing a shear blade in said frame across said opening to cut into the tree trunk transversely, a splitter wedge aligned with said opening in confronting relation to the leading end of a tree trunk projecting through said opening, and means for driving said splitter wedge into said leading end of the tree trunk when said shear blade has advanced almost but not entirely through the tree trunk, said shear blade serving as a chuck and anvil to hold the tree trunk in a splitting operation.

* * * * *

UNITED STATES PATENT AND TRADEMARK OFFICE
CERTIFICATE OF CORRECTION

PATENT NO. : 4,398,581

DATED : August 16, 1983

INVENTOR(S) : Warren A. Aikins and Thomas N. Melin

It is certified that error appears in the above-identified patent and that said Letters Patent are hereby corrected as shown below:

Column 1, line 37, "all" should be -- fall --.

Column 5, line 7, "attachment" should be plural.

Claim 1, column 7, line 11, "a wedge on" should be deleted.

Signed and Sealed this

Eighteenth Day of October 1983

[SEAL]

Attest:

GERALD J. MOSSINGHOFF

Attesting Officer     Commissioner of Patents and Trademarks